3,681,281
FLAME-RETARDANT POLYESTERS

Charles V. Juelke, Morristown, and Louis E. Trapasso, Westfield, N.J., assignors to Celanese Corporation, New York, N.Y.
No Drawing. Filed July 10, 1970, Ser. No. 54,010
Int. Cl. C09k 3/28; D06p 3/54
U.S. Cl. 260—45.8 N                    11 Claims

ABSTRACT OF THE DISCLOSURE

Fibers and other shaped structures of polyesters such as polyethylene terephthalate are rendered flame-retardant by the incorporation of tertiary phosphine oxides such as triphenyl phosphine oxide or ethylene bis-di-phenyl-phosphine oxide optionally along with a synergist such as benzil, dibenzyl or triphenylmelamine.

---

This invention relates to flame-retardant compositions. More particularly, this invention relates to flame retardant polyester compositions comprising various monomeric phosphine and diphosphine oxides and polymeric phosphine oxides.

Fibers and films made from polyesters such as polyethylene terephthalates have found wide acceptance, but exhibit flame retardance on the order of that of cotton, which is somewhat less than might be desired. At present, there is no additive in commercial use to impart thereto a more desirable level of flame retardance.

It has been suggested in U.S. Pat. No. 3,370,030 that thermoplastic compositions may be rendered flame-retardant by adding a synergistic combination whose critical components are a chlorinated hydrocarbon and certain diphosphine oxides. When the combination is added to the thermoplastic polymer polyethylene terephthalate, it has been discovered that it leads to degradation of the polymer at temperatures sufficient to yield a melt suitable for spinning, on the order of 280–299° C. Hence this proposed synergistic combination is not a practical solution to the problem of flammability of polyethylene terephthalate.

It is accordingly an object of this invention to provide a material which may be added to polyester fiber and film forming masses, which additive material imparts flame retardance.

It has been found, unexpectedly in light of the teachings of U.S. Pat. 3,370,030, that tertiary phosphine oxides, in the absence of chlorinated hydrocarbon, may be used to impart acceptable levels of flame retardance to polyester fiber and film forming masses at low weight without deleteriously affecting other properties of the polymer and with a positive effect on some. The phosphine oxides may be monomeric, carrying hydrocarbon radicals, e.g. alkyl, aralkyl, aryl and alkenyl substituents, optionally substituted with chlorine, bromine, or other substituents known to be inert or having a flame-retardant effect, such as methyl, ethyl, propyl, hexyl, octyl, allyl, benzyl, 3,5-dichlorobenzyl, tolyl, hydroxyethyl, carboxyethyl, and the like, and especially phenyl. Alternatively, di-phosphine oxides may be employed wherein two phosphorus atoms are linked by a bifunctional group such as lower alkylene, e.g. ethylene, or arylene, e.g. phenylene, xylylene, biphenylene, and the like, with the other substituents as above. As noted, it is possible for the tertiary phosphine oxides to carry alkenyl substituents such as vinyl, allyl, and the like, in which case they may be polymerized before or after extrusion. Representative phosphine oxides include tributyl phosphine oxide, triphenyl phosphine oxide, methylene bis-diphenylphosphine oxide, ethylene bis-di-phenyl phosphine oxide, xylylene bis-di-phenyl phosphine oxide, poly-vinyl-di-phenyl phosphine oxide, tribenzyl phosphine oxide, tris-hydroxyethyl phosphine oxide, di-hydroxyethyl phenyl phosphine oxide, tris-carboxyethyl phosphine oxide, and the like.

The amount of additive included in the polymer depends on the level of flame retardance desired in a particular application of a polyester fiber or film forming mass. About 10 weight percent or more of the additives will impart self-extinguishing properties to the polyester mass. When the additive level is lowered to below about 5 weight percent the polyester mass is no longer self-extinguishing but still resists burning better than such masses without the additive. At a level of about 1 weight percent, while flammability is reduced, it is not sufficiently flame retardant for most purposes. Larger amounts than those indicated serve no purpose.

In accordance with a further aspect of the invention there may also be incorporated along with the phosphine oxide a flame retardant synergistic additive. Representative materials include triphenylmelamine, benzil

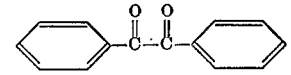

and dibenzyl

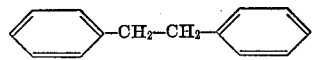

Surprisingly, it has been found that the effect of relatively small amounts of phosphine oxide plus synergist is far greater than the expected cumulative effect, the additives alone having only a slight effect. To date the exact mechanism of the interaction is not known. The synergist may be employed in amounts by weight up to about 5% or more of the polyester although advantageously it is present in less than about 2.5% preferably about 1 to 2%. Smaller amounts can also be used but for significant synergistic action the indicated minimum is found desirable. When employed, preferably the synergist is present in about 10 to 30% and especially 15 to 25% by weight of the phosphine oxide.

The various monomeric phosphine and diphosphine oxides and polymeric phosphine oxides of this invention may be produced by any known procedure, such as the direct oxidation of the corresponding phosphine, the reaction of the corresponding chloro-phosphine with the corresponding glycol, polymerization of the corresponding vinyl compound and the like.

The novel flame-retardant additives claimed herein may be incorporated in the polyester by any known method. For example, the materials may be added by blending them with the polyester in powder form and thereafter forming the desired ultimate product. Alternatively the additives may be dissolved and injected into molten polyester and coextruded, or the additives and polyester may both be dissolved, the solutions combined and formed into shaped structures by wet or dry spinning. If the polyester is first formed into a structure such as a fiber, the additives in solution may be padded thereon and allowed to penetrate, possibly with the aid of heat to accelerate the migration. The fibrous structure may be in the form of a fabric possibly blended with other fibrous materials such as cotton, rayon, nylon, acetate, acrylics, and the like. It is also within the scope of the invention to incorporate additional ingredients such as plasticizers, dyes, pigments, heat and light stabilizers, antioxidants, antistatic agents, photochromic materials and the like into the flame-retarded polyesters along with the novel additives.

Polyesters as employed herein have reference to fiber-forming polymers of glycols and dicarboxylic acids. Representative glycols include aliphatic and especially lower alkylene glycols or polyglycols as well as cycloaliphatic or aromatic glycols, e.g. ethylene glycol, butylene glycol, ethylene diglycol, dimethylolcyclohexane, and the like. Representative dicarboxylic acids include the aromatic and aliphatic acids, especially terephthalic, isophthalic and adipic acids although other acids such as bi-benzoic acid, 4,4'-dicarboxyphenyl methane, naphthalene dicarboxylic acid, sebacic acid, and the like, may be present alone or as copolymerized moieties. Of these, poly-lower alkylene glycol terephthalates and especially polyethylene and polybutylene terephthalates are preferred. A small proportion of other substances may be copolymerized therewith to modify dyeability or for other purposes, e.g. 5-sulfo-isophthalic acid.

The invention will be further described in the following illustrative examples wherein all parts are by weight unless otherwise specified.

EXAMPLE I (a) 95 parts of chip of polyethylene terephthalate of 0.88 I.V. are dry blended with 5 parts of tri-phenyl phosphine oxide and the blend melt spun at 290° C. into a 34 filament yarn of 143 denier having an I.V. of 0.7. 0.25 gram of filament is rolled by hand into a loose ball, held in a pair of tweezers and moved about in the yellow portion of the flame of a butane cigarette lighter. After the initially fluffy ball had become consolidated, but before melting, the sample is held steady in an attempt to ignite it. Compared to a control containing no triphenylphosphine oxide which ignites and burns, the sample resists burning.

(b) A sample similarly prepared but containing 10 parts of tri-phenylphosphine oxide is self-extinguishing, i.e. when removed from the flame it will not support combustion.

(c) Another sample containing 5% of triphenylphosphine oxide and 1% of dibenzyl is also self-extinguishing.

(d) The same result is achieved if the dibenzyl of (c) is replaced by benzil.

EXAMPLE II

Example I(a) is repeated, replacing the tri-phenylphosphine oxide with 10% of xylylene bis-di-phenylphosphine oxide, melting point 330–333° C., prepared from di-phenyl chlorophosphine and xylylene glycol in accordance with the following equations:

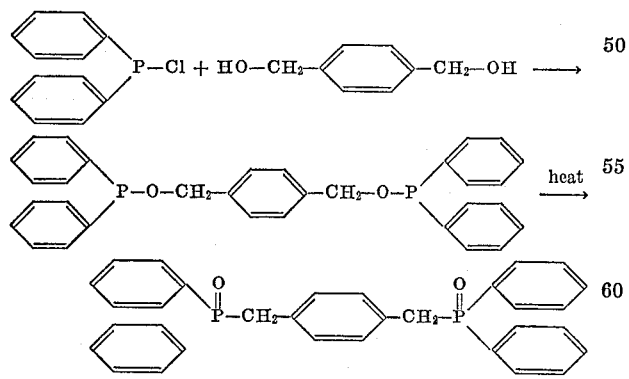

The resulting fiber is self-extinguishing. Because the additive melts higher than the polyester, it is dispersed in the fiber like an organic filler.

EXAMPLE III

Example I(a) is repeated, replacing the tri-phenyl phosphine oxide with 5% of ethylene bis-di-phenylphosphine oxide, melting point 272–4° C., prepared from diphenyl chlorophosphine and ethylene glycol. The lustrous homogeneous fibers are self-extinguishing.

EXAMPLE IV (a) Replacing the phosphine oxide of Example I(a) with tributyl phosphine oxide, vinyl di-phenyl phosphine oxide, or poly-vinyl di-phenylphosphine oxide gives substantially similar results.

(b) 5% of xylylene bis-di-phenylphosphine oxide gives a fiber which is flame retardant; a 7% blend is even more difficult to ignite.

(c) 2.5% of ethylene bis-di-phenylphosphine oxide and 2.5% of polybenzyl gives a fiber which is flame retardant whereas 5% of either of these substances alone is less effective.

(d) 2% of ethylene bis-di-phenylphosphine oxide and 1% of triphenylmelamine gives a fiber which is as flame retardant as one containing 5% of ethylene bis-di-phenylphosphine oxide alone.

The same combination incorporated in the same manner into a nylon fiber is without effect. Nylon fiber burns even if each of the foregoing ingredients is present simultaneously to the extent of 5% by weight.

Not only are the physical properties unimpaired to a significant extent but, in some respects, they are enhanced. Thus if hoselegs knit from the fiber of Example I(a) and a control containing no additive are dyed in a dyebath at 95° C. containing 1% by weight of Resoline Blue FBLD as a representative disperse dye, the fiber containing the additive dyes to a much deeper shade. This is partially due to an increase dye pickup but is also partially due to a greater coloring power as evidenced by the fact that even when the dye pickups are at the same level (by dyeing the fibers separately under different conditions) deeper color will be apparent in the sample containing the additive. Substantially similar results are achieved with other disperse dyes.

While the invention has particularly been described with reference to funicular structures such as fibers and films, it is applicable generally to shaped structures of polyesters as defined in the Federal Trade Commission Rules promulgated pursuant to the Textile Fiber Identification Act.

The polyester fibers of the present invention are well suited for broad use in the textile, apparel and industrial fields. In the apparel field, they may be used for a variety of men's, women's and children's wear in a 100% form, in blends with other fibers such as cellulosic fiber, wool and the like. Some applications for 100% polyester, or in blends with other fibers are in: men's and boys' shirts, suits, slacks, sportswear, uniforms, and the like. Important home furnishings applications include filler products such as pillows and comforters, shear curtain fabric and the like. In addition, many other applications, such as nonwoven materials, and the like are possible. Many equivalent modifications will be apparent to those skilled in the art from a reading of the above description without a departure from the inventive concept.

What is claimed is:

1. A shaped structure comprising polyester, at least 1 percent by weight of polyester of tertiary phosphine oxide, and from about 10 to about 30 percent by weight of tertiary phosphine oxide of synergist selected from the group consisting of triphenylmelamine, benzil, and dibenzyl.

2. The structure of claim 1, wherein synergist is benzil.

3. The structure of claim 1, wherein said synergist is dibenzyl.

4. The structure of claim 1, wherein synergist is triphenylmelamine.

5. The structure of claim 1, wherein said phosphine oxide is triphenyl phosphine oxide.

6. The structure of claim 1, wherein said phosphine oxide is tributyl phosphine oxide.

7. The structure of claim 1, wherein said phosphine oxide is ethylene bis-diphenyl phosphine oxide.

8. The structure of claim 1, wherein said phosphine oxide is xylylene bis-diphenyl phosphine oxide.

9. A shaped structure comprising polyester and a tertiary phosphine oxide in an amount sufficient to improve the flame-retardancy of said polyester, wherein:
  (a) said structure comprises a fibrous material made up of a polyester of a lower alkylene glycol and an aromatic dicarboxylic acid having the tertiary phosphine oxide distributed uniformly therethrough,
  (b) said tertiary phosphine oxide comprises ethylene bisdiphenyl phosphine oxide present in about 2.5 to 5% by weight, and
  (c) said structure further includes about 1 to 2% by weight of benzil, dibenyl, or triphenylmelamine as a flame retardant synergist.

10. The structure according to claim 9, dyed with a disperse dye.

11. A shaped structure comprising polyester, at least 1 percent by weight of polyester of polyvinyl diphenyl phosphine oxide, and from about 10 to about 30 percent by weight of polyvinyl diphenyl phosphine oxide of synergist selected from the group consisting of triphenylmelamine, benzil, and dibenzyl.

References Cited
UNITED STATES PATENTS

| | | | |
|---|---|---|---|
| 3,480,582 | 11/1969 | Brooks | 260—45.75 |
| 3,356,631 | 12/1967 | Jackson, Jr., et al. | 260—31.2 |
| 3,341,625 | 9/1967 | Gillham et al. | 260—887 |
| 3,284,543 | 11/1966 | Gillham et al. | 260—887 |
| 2,996,475 | 8/1961 | Joyner et al. | 260—873 |
| 3,299,015 | 1/1967 | Miller | 260—80 |
| 3,293,105 | 12/1966 | Koller | 161—67 |
| 3,423,923 | 1/1969 | Hume | 57—140 |
| 2,642,461 | 6/1953 | Morris et al. | 260—606.5 |
| 3,549,741 | 12/1970 | Caison et al. | 264—210 |
| 3,560,441 | 2/1971 | Schwarcz et al. | 260—45.75 |
| 3,576,783 | 4/1971 | Kerst | 260—45.8 |
| 3,583,938 | 6/1971 | Okada et al. | 260—45.9 |
| 3,595,835 | 7/1971 | Pilz et al. | 260—45.85 |

DONALD E. CZAJA, Primary Examiner

R. A. WHITE, Assistant Examiner

U.S. Cl. X.R.

8—21 A, 21 B, 21 C, 165, 168, 171; 260—45.7 P, 45.7 R, 75 P, 873